United States Patent [19]

Eriksson

[11] 4,140,077
[45] Feb. 20, 1979

[54] PORTABLE NAVIGATIONAL AID

[76] Inventor: Lars-Goran Eriksson, Pl 12383, 45100 Uddevalla, Sweden

[21] Appl. No.: 749,767

[22] Filed: Dec. 13, 1976

[30] Foreign Application Priority Data

Dec. 15, 1975 [SE] Sweden .............................. 7514115

[51] Int. Cl.$^2$ ..................... G01C 21/00; G09F 9/00
[52] U.S. Cl. .................... 116/320; 33/15 D; 73/178 R; 116/26; 116/309
[58] Field of Search ............... 33/1 SB, 1 SD, 349; 73/178 R; 116/129 E, 129 F, 129 T, 129 E, 129 R, 133, 134, 26; 235/61 NV

[56] References Cited

U.S. PATENT DOCUMENTS

| | | | |
|---|---|---|---|
| 2,912,776 | 11/1959 | Koerber | 116/133 X |
| 3,373,493 | 3/1968 | McDonald | 235/61 NV |
| 3,432,927 | 3/1969 | Springer | 33/1 SD |
| 3,646,681 | 3/1972 | Koenig | 33/1 SD |
| 3,721,007 | 3/1973 | Banner | 33/1 SD |
| 3,745,313 | 7/1973 | Spilhaus | 33/1 SD |

FOREIGN PATENT DOCUMENTS

| | | | |
|---|---|---|---|
| 53680 | 5/1912 | Fed. Rep. of Germany | 116/133 |
| 436710 | 10/1935 | United Kingdom | 116/129 E |
| 515446 | 12/1939 | United Kingdom | 116/134 |
| 1299595 | 12/1972 | United Kingdom | 116/134 |

*Primary Examiner*—Daniel M. Yasich

[57] ABSTRACT

A portable navigational aid or device for use in a user-sailboat or similar vessel, where the user-sailboat and another approaching boat are traveling along courses which intersect, to indicate readily whether the user-sailboat should have the right-of-way considering the direction of the wind, the angles of approach of the two boats and the local governing rules regarding the right-of-way. The device includes a disc-shaped member which is held on board the user's boat so that an arrow on the disc-shaped member points in the direction of the wind. A marked pivoted indicator dial having a user-boat symbol is pivoted with the disc-shaped member and is oriented such that the user-boat symbol coincides with the direction of travel of the user's boat. With the device so held and oriented, for an approaching vessel the direction of which may coincide with one of a plurality of symbols on the disc-shaped member, a selected window on the disc-shaped member is looked into to view distinguishable annular red and green areas on the dial indicator. A red color visible in a window corresponding to an approaching vessel indicates that the approaching vessel should yield the right-of-way to the user-sailboat. If green, the approaching vessel has the right-of-way, and the user-sailboat should yield.

13 Claims, 9 Drawing Figures

PORTABLE NAVIGATIONAL AID

BACKGROUND OF THE INVENTION

1. Field of the Invention

The invention relates to a portable navigational aid device for sailboats and like vessels for quickly determining which of two vessels which are crossing one another's courses should give the right-of-way to the other according to local rules of navigation.

2. Description of the Prior Art

The number of pleasure sailors has been increasing substantially during the past decade. Many of the persons piloting pleasure craft are only dimly and imprecisely aware of the various rules of the road as applied to boating. Therefore, in crowded waterways when decisions of right-of-way must be made very rapidly, considerations of tacking, wind velocity, wave conditions, etc. also occupy the mind of the person piloting the boat.

For sailing boats the rules of the road are rather complex, taking into account the wind direction with respect to each of the meeting vessels, their location and which boat is leeward of the other and the directions of their respective courses with respect to the wind and to one another. To determine the complex rules of the road, in addition to handling the exigencies of a boat, often results in errors which give rise to potentially dangerous accident situations.

In Swedish Pat. No. 1098 which deals with the study of the international rules of the road concerning ships, there is described a device called a navigation capstan. This device is large and unwieldy, being usable only by captains of large vessels, and is not meant to be used by persons sailing small pleasure craft. Nor does it provide an inexpensive and quick answer for the question as to which of the two meeting vessels has the right-of-way according to the local rules for sailboats.

SUMMARY OF THE INVENTION

With the object of obviating the foregoing disadvantages a navigational aid device, preferably in the form of a hand-held gadget, is provided according to the invention. The invention resides in a navigational aid for use aboard a vessel on a body of water, for use in determining the right-of-way of vessels being met by a user's vessel, said navigational aid comprising: a first flat member, a second flat member disposed adjacent the first member, rotatable fastening means for fastening said first member to the second member such that said first member is rotatable around the fastening means with respect to said second member, said first member having at least one symbol thereon for designating a position and course of at least a first vessel, said second member having at least one symbol thereon for designating a position and course of a second vessel, said first member having means for viewing selected portions of the second member, said viewing means having a predetermined relationship to said at least one symbol on said first member, said second member having visibly distinguishable areas for viewing through said viewing means, the areas having a predetermined relationship to said at least one symbol on said second member, said areas being disposed on said second member and said viewing means being disposed on said first member and relative to one another such that upon rotation of the first member with respect to the second member about said fastening means to orient the relative position of one vessel with respect to at least one other vessel such that the areas exposed by the viewing means indicate at least the right-of-way of one vessel over the other vessel.

With such a navigational aid, whether or not the user should yield the right-of-way can be determined very quickly. The stopping or giving the right-of-way is rendered simple, and the boat given the right-of-way for the various courses on the marking disc is in accordance with, for example, the international rules of the road which are promulgated for sailboats, as follows: "(a) When two sailing vessels are approaching one another, so as to involve risk of collision, one of them shall keep out of the way of the other as follows:-- (i) When each has the wind on a different side, the vessel which has the wind on the port side shall keep out of the way of the other. (ii) when both have the wind on the same side, the vessel which is to windward shall keep out of the way of the vessel which is to leeward. (b) For the purposes of this Rule the windward side shall be deemed to be the side opposite to that on which the mainsail is carried or, in the case of a square-rigged vessel, the side opposite to that on which the largest fore-and-aft sail is carried," or the Inland Rules of the road as follows. "When two sailing vessels are approaching one another, so as to involve risk of collision, one of them shall keep out of the way of the other as follows, namely: (a) A vessel which is running free shall keep out of the way of a vessel which is closehauled. (b) A vessel which is closehauled on the port tack shall keep out of the way of a vessel which is closehauled on the starboard tack. (c) When both are running free, with the wind on different sides, the vessel which has the wind on the port side shall keep out of the way of the other. (d) When both are running free, with the wind on the same side, the vessel which is to the windward shall keep out of the way of the vessel which is to the leeward. (e) A vessel which has the wind aft shall keep out of the way of the other vessel." The rules giving the right-of-way for motor vessels traveling in the dark can also be quickly determined with a navigational aid according to the invention. Navigational rules of the road prescribe that the motor vessel which has another motor vessel off its starboard side should give the right-of-way to that vessel on the starboard side. For details of such sets of rules, reference may be had to the publication *Rules of the Road, International-Inland,* reference number C.G. 169 published on Aug. 1, 1972 by the United States Coast Guard, Department of Transportation and readily available at U.S. Coast Guard Offices. Persons sailing at various times under differing rules of the road will find a navigational aid very useful in order to clear up any confusion as to the interpretation thereof and thereby avert potentially hazardous situations.

In a preferred embodiment of the navigational aid constructed according to this invention the right-of-way rules for sailing vessels are provided on one side of the marked dial indicator and the rules for motor vessels on the other side. On each side of the marked indicator dial is disposed an overlay dial, one having designation for sailing vessels and the other having the necessary designation for motor-driven vessels.

DESCRIPTION OF THE PREFERRED EMBODMENT

Figure 1:
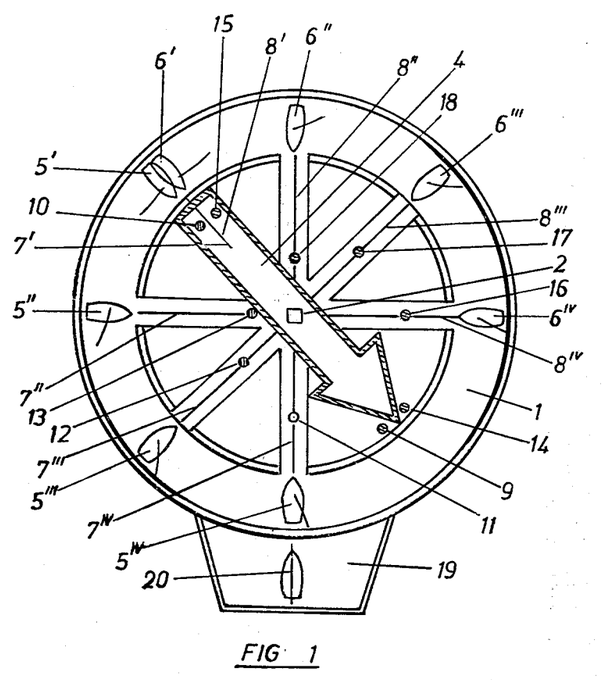
FIG. 1 illustrates pictorially a marked indicator dial of the present invention for determination of right-of-way rules for sailing boats; outside the underlay dial is a displaced symbol for the user's own vessel on the marked indicator disc.

The navigational aid, according to FIG. 1, as can be seen from the drawings, is preferably comprised of a first round disc called an overlay disc or dial 1. Around a central axis 2 of a pivot the overlay disc 1 can be rotated with respect to the marked indicator dial or disc 3. On the overlay dial an arrow 4 is disposed which indicates the direction of the wind by having its tail disposed into the wind. Around the overlay dial's periphery, vessel symbols $5^{I-IV}$, $6^{I-IV}$, are disposed which show various positions of sailboats which may be meeting the user's boat. The sailboats are shown with sails having axes which extend from the masts horizontally to the ends of the sails having the greatest horizontal displacement from the masts make successively greater angles with the axes of the boats extending from the bows to the sterns thereof as these vessel symbols $5^{I}$-$5^{IV}$ and $6^{I}$-$6^{IV}$ having the wind from the sterns thereof.

The courses of the sailboats around the periphery of the overlay dial 1 are directed toward the central axis 2. These courses are designated by $7^{I}$ to $7^{IV}$ and $8^{I}$ to $8^{IV}$ respectively and are shown on the overlay dial as radially inward straight lines. Symbols for the vessels $5^{1}$ to $5^{IV}$, $6^{I}$ to $6^{IV}$, are disposed on the overlay dial 1 around its edge, for example, at successive displacements of 45° from one to the other with respect to the central axis 2. Immediately in front of the head of the arrow 4 showing the direction of the wind, the vessel symbol has been omitted. Double-vessel symbols $5^{I}$, $6^{I}$ are disposed at the tail of the arrow 4 on either side thereof. With each course $7^{I-IV}$ and $8^{I-IV}$ holes 9, 11–13 and 15–18 in the overlay dial 1 as illustrated for example are disposed and displaced at predetermined angles from the head of the arrow 4 towards its tail. The courses $7^{I}$ and $8^{I}$ indicate running before the wind; that is, having the wind coming from the aft of the vessel; circular opague areas, called false holes 10, 14 with an inhibit or a permit marking thereon which show the right-of-way giving rules for vessels on these courses $7^{I}$, $8^{I}$ which are meeting the user's vessel 20. The inhibit or yield-the-right-of-way markings are red for the boat being met, shown on the drawing as black and the permit or taking the right-of-way markings for the boat being met are green and are shown on the drawing as hatched section.

For course positions of the sailing boats which have the right-of-way over the user's own vessel, the navigational aid according to the invention indicates a green (i.e., hatched) marking in the holes 9 through 18 which lie on or close to the course of the vessel being met.

In summary, when one of the holes 9, 11–13 and 15–18 in front of its corresponding vessel $5^{II}$-$5^{IV}$ and $6^{II}$-$6^{IV}$ is red, that vessel being met should yield the right-of-way to the user's vessel and when a corresponding hole is green the user's vessel should yield the right-of-way to the vessel being met. When sailboats being met should give the right-of-way to the user's own vessel, a red mark is shown in one of the holes 9 through 18, which lies on or close to the course of the vessel being met. Red markings have been shown by black in the holes 9 through 18, which hole indicates the course of the meeting vessel.

In order that different positions with respect to the user's sailboat and the sailboat being met can be shown in different colors in the holes 9, 11–13, 15–18, for the different courses on overlay dial 1, the turnable marked indicator dial 3 is provided with a protruding portion which protrudes beyond the periphery of the overlay dial 1 and provides a handle 19 for holding the navigational aid. On the handle 19 is shown a symbol for the user's own vessel 20 and its course. In addition, the marked indicator dial 3 is pivoted so as to allow rotation with respect to overlay dial 1 about the central axis 2. On the marked indicator dial 3 on the side which is disposed in apposition with the overlay dial 1, annular fields 21–28 are marked concentrically about the central axis 2 and form eight concentric areas. A portion of these fields 21–28 is disposed at different angles on the overlay dial 1 in relationship to the marked indicator dial 3 selectively under the holes 9, 11–13, 15–18 on the overlay dial 1. The fields 12–28 are provided with differently marked zones which are preferably chosen to be red when the right-of-way must be given to the meeting vessel and green when the right-of-way belongs to the vessel which is being met. Alternatively, any other color or other coding may be used as desired.

On the marked indicator dial 3 the annular fields 21–28 are interrupted by a symbol for the user's own vessel 20 and an area from the central axis 2 to the owner's vessel 20 is shown as being white. This white area 38 is provided such that it can be seen through one or more of the holes 9, 11–13, 15–18 if the vessel being met is on the same course as the user's own vessel 20. In the preferred embodiment of the invention the radius, annular width and the length of arc of the annular segments of the annular fields 21–28 have been determined empirically by applying the International Rules of the Road for each and every position of the wind as indicated by the arrow 4 with respect to the user's own vessel and to each of the positions of another, approaching vessel.

In order to very clearly show the right-of-way rules for sailboats even when these vessels sail closer than 45° into the wind and further than 135° from the wind, the overlay dial 1 has vessel symbols $5^{I}$, $6^{I}$ given as two markings which are somewhat displaced from each other which represent vessels which have sails carried in opposite directions with respect to the course of travel of the boat. These boats are on the same course and are shown as $7^I$, $8^I$.

Figure 4:
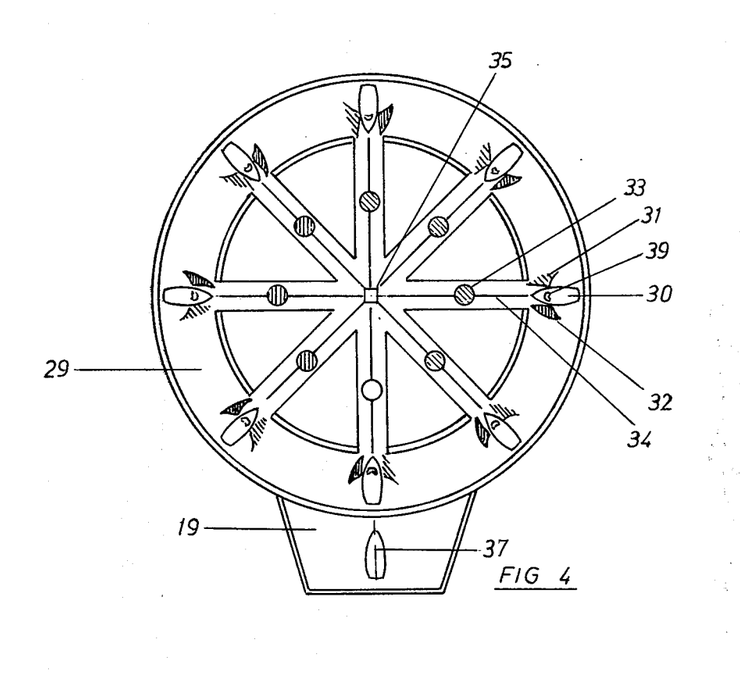
FIG. 4 shows the overlay dial in the embodiment for travel during the dark by motor vessels and a symbol for the user's own vessel as being marked on the marked indicator dial protruding from under the overlay dial.

In FIG. 4, an alternative embodiment of the invention is shown for the navigation of powered vessels during the hours of darkness. A user's vessel 37 is disposed on the flat side of the handle 19 of the marked indicator disc 3 opposite the side on which the vessel 20 is disposed. A darkness overlay disc or dial is affixed to the side of the indicator disc 3 opposite the overlay disc 1 by pivoting means 35. Holes such as a hole 33 are disposed along course lines such as course line 34 indicating the course of a meeting vessel 30. The vessel 30 has a red light 32 on its port side and a green light 31 on its right side. The color showing through each hole 33 indicates as above whether the vessel 30 on the associated course line 34 has the right-of-way over or should yield the right-of-way to the user's vessel 37.

Figure 5:
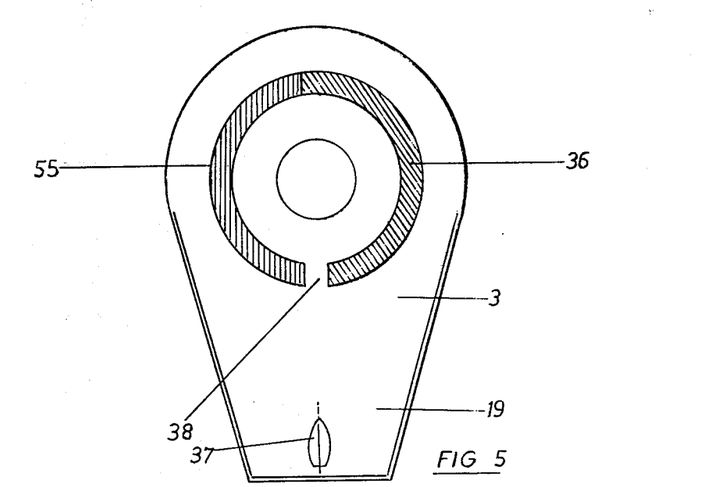
FIG. 5 shows the flat side of the marked indicator dial 3 opposite the side shown in FIG. 3 which opposite side has a single annular area for use with the navigational rules of the road during the dark.

As shown in FIG. 5, a red section 55, a green section 36 and a white section 38 are disposed on the side 19 of the marked indicator disc 3.

Figure 2:
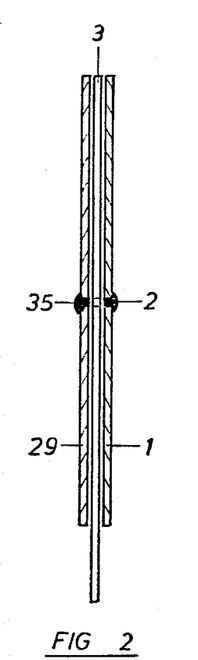
FIG. 2 shows a side view of the navigational aid according to FIG. 1.

The discs 1, 3 and 29 are preferably made of metal but may also be made of a plastic material. In FIG. 2, the overlay disc 1 and the darkness overlay disc or dial 29 are shown fastened to the marked indicator disc 3 by pivots 2 and 35.

The exact design of the marked indicator 3 will depend mainly on the local rules applicable for sailboats. An example of such local rules is the Inland Rules of the Road to be found in the publication C.G. 169 of the U.S. Coast Guard referenced hereinbefore. It should be appreciated that the governing rules may change from country to country and may be different again compared to the international rules. The layout of the concentrically disposed annular fields, as will be evident to one who is skilled in the art, will depend on the governing rules, which among other things will consider the wind direction, the relative angles of travel of the sailboats with reference to the wind direction, including sometimes special rules for local waters.

Figure 6:
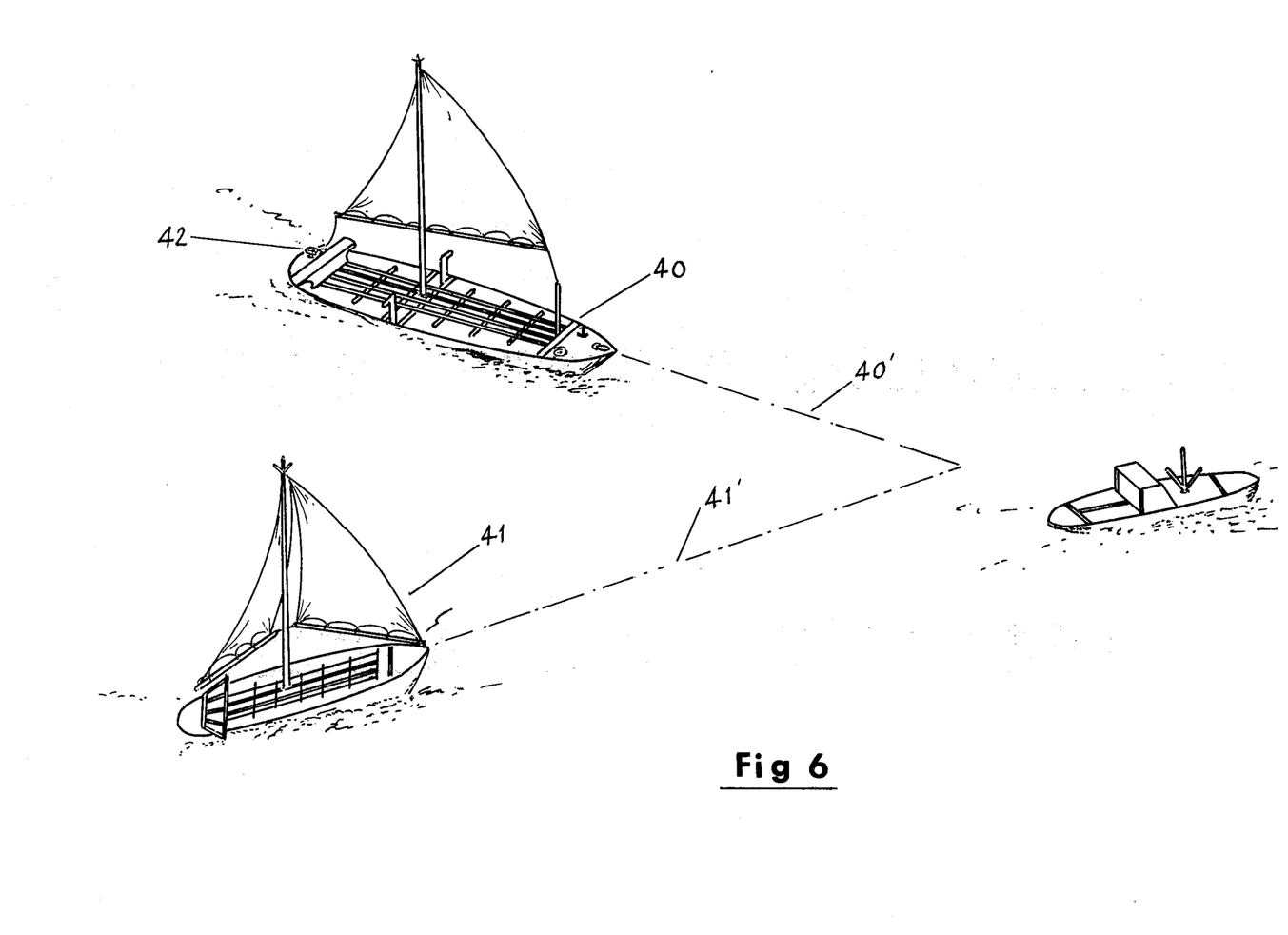
FIGS. 6 and 7 show in a pictorial manner respectively the device of the invention in use on a user vessel, and a situation where the user-vessel encounters a second sailboat thereby creating a need for the use of the device to determine which has the right-of-way.

As shown in FIG. 6, the device of the present invention may be mounted horizontally by means of any known fixture or a convenient suspension. Alternatively, the device may be hand-held for use only when necessary, andput away when not in use.

Figure 7:
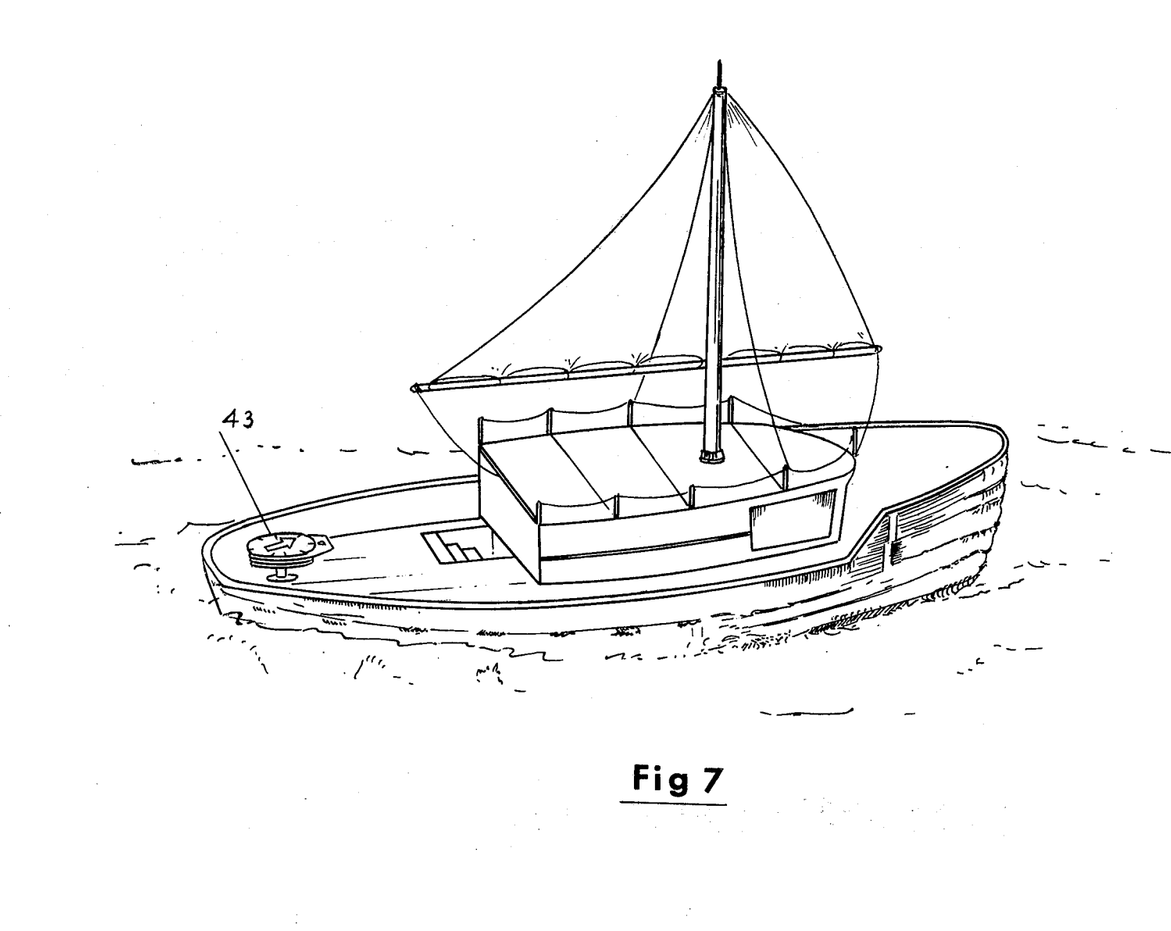

FIG. 7 pictorially illustrates a user sailboat having the device on board, together with a proximate second sailing vessel which has a course intersecting that of the user vessel. Immediately after deriving an indication regarding whether the user-vessel has the right-of-way or not, the user vessel will act accordingly, thereby averting collisions and possible damage to the vessels.

Figure 8:
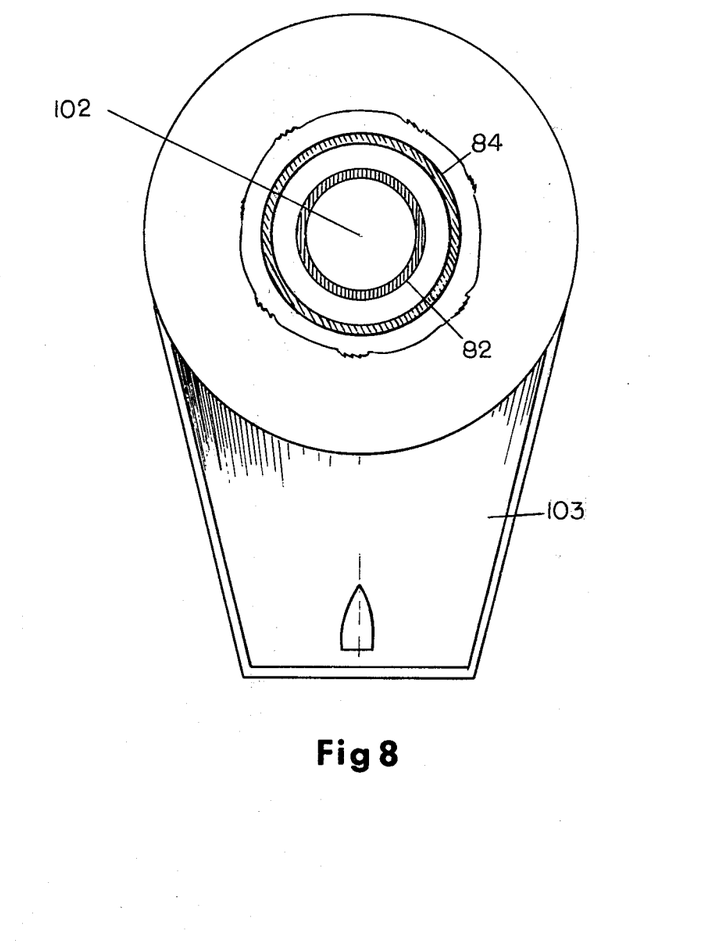
FIG. 8 shows an alternative embodiment of the marked indicator dial for use according to the Inland Rules of the Road cited above.
Figure 9:
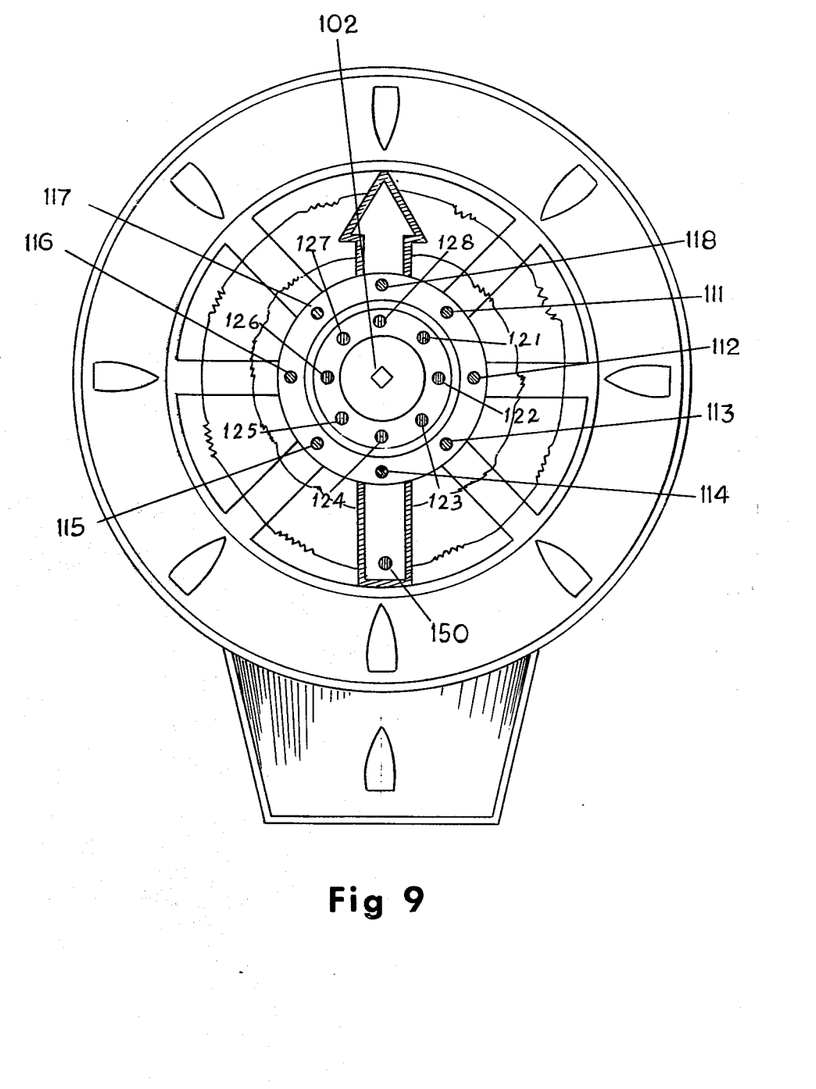
FIG. 9 shows an alternate embodiment of the overlay dial or disc for use according to the Inland Rules of the Road cited above.

Referring now to FIGS. 8 and 9, an embodiment of the invention according to the Inland Rules of the Road referenced above is shown.

Figure 3:
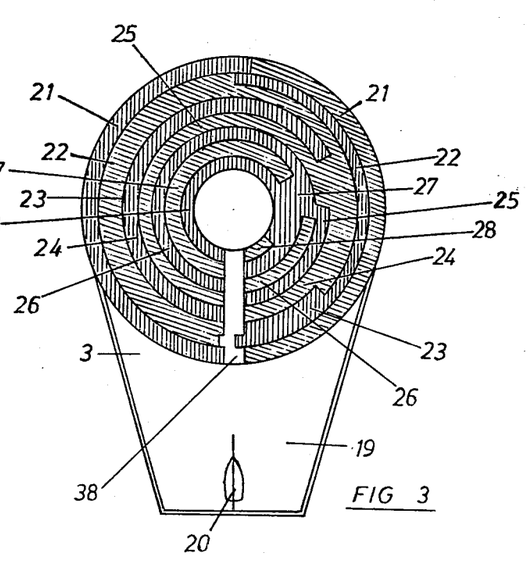
FIG. 3 shows a view of an exemplary marked-indicator dial with several annular fields disposed according to one known set of navigational rules for sailing vessels.

Referring to FIG. 8, a portion of a marked indicator dial or disc 103 is shown in detail. The portions of the marked indicator dial or disc 3 which are not shown are identical to those shown in FIG. 3. On an indicator dial 103 a red annular region 82 is disposed in the proximity of the center of the dial with a central axis 102 as its center. A green annular region 84 is disposed concentric to the red annular region 82 and further from the central axis 2 than the red annular region 82 on the dial $3^I$.

Referring to FIG. 9 an overlay disc 101 is shown on which each of the courses $7^{I-IV}$ and $8^{I-IV}$ as shown in detail in FIG. 1, one each of a series of holes 111-119 is located at substantially the same distance from a central axis 102 and on courses one of which $107^{IV}$ is shown.

The holes 111-119 are disposed such that when the overlay disc 101 and the marked indicator disc 103 are aligned about their central axis 102 the holes 111-119 are aligned above the green annular region 84. Another series of holes 121-129 also are spaced substantially the same distance from the central axis 102 and one on each of the course lines corresponding to the courses $7^{I-IV}$ and $8^{I-IV}$ of FIG. 1 are disposed on the overlay disc 101 closer to the central axis 102 than the holes 111-119. The holes 121-129 are disposed such that they align with the red annular region 82 on the marked indicator disc 103 when assembled with the overlay disc 101.

The other difference between the overlay discs 1 and 101 is that instead of having two blind holes 10 and 15 the Inland Rules embodiment 101 has only one red blend hole 150 in accordance with part (e) thereof.

The holes 111-119 correspond to the case when the user's vessel is running free and the other vessel is close-hauled. The holes 121-129 correspond to the case when the user's vessel is close-hauled and the other vessel is running free.

OPERATION OF THE INVENTION

The marked indicator dial 3 is positioned such that the symbol of the user's own vessel 20 is aligned with the user's own vessel as shown in FIG. 7 with the direction of the bow of both the symbol and the user's own vessel on the same heading. The overlay disc 1 is then rotated until the arrow 4 is aligned with the wind that is with the head of the arrow pointing in the same direction as the wind is blowing towards.

If another vessel is approaching on a near collision or close proximity course, the course of another vessel is determined and located and referred to the nearest one of the vessel symbols $5^I$ to $5^{IV}$ and $6^I$ to $6^{IV}$. Then after determining which of the symbols $5^I$ to $5^{IV}$ and $6^I$ to $6^{IV}$ is the hole among holes 11-13 and 16-18 along the chosen symbols' course, that is, one of $7^I$ to $7^{IV}$ and $8^I$ to $8^{IV}$ is observed. If the hole shows up as green, the other vessel has the right-of-way over the user's vessel and if the hole shows up as red, the user's vessel has the right-of-way over the other vessel.

For example, according to FIG. 1, a vessel corresponding to the symbol $6^{IV}$ has the right-of-way over the user's vessel because the hole 16 shows green. In contrast a vessel corresponding to the symbol $5^{III}$ should yield the right-of-way to the user's vessel because the hole 12 shows red.

The embodiment shown in FIG. 5 functions similarly to the embodiment of FIG. 1 except that the wind does not have to be taken into account. Variations in constructional and other small details of the device are entirely within the scope of the invention which is broadly defined and claimed in the appended claims.

I claim:
1. A portable nagivational aid for use aboard a sailboat sailing on a body of water, for use in determining the right-of-way of approaching sailboats being met by a user's sailboat, by considering the wind-direction on said body of water, said navigational aid comprising:
a first flat member having thereon a pointing mark to designate the direction of the wind when said navigational aid is to be read, and at least one symbol thereon for designating a position and course of at least a first approaching sailboat;
a second flat member disposed in apposition to the first member and having at least one symbol thereon for designating a position and course of said user's sailboat;

pivoting means for pivotally fastening said first member to the second member so as to permit relative rotational movement therebetween about said pivot, said first member having at least one means for viewing selected portions of the second member, said viewing means being aligned substantially radially with respect to said at least one symbol on said first member, said second member having at least a first and a second visually distinguishable area marked thereon for being selectively viewed through said viewing means upon relative rotation between said first and second members, the first and second distinguishable areas comprising concentric annular portions, the areas having a predetermined relationship with the location of said at least one symbol on said second member whereby when the second flat member is rotated about said pivot so that its symbol is aligned with the position and course of the user's sailboat and the first flat member is oriented such that said pointing mark points along the direction the wind is blowing on said body of water, said at least one viewing means displays at least either the first or second of said distinguishable areas which respectively and readily indicate to the user either to yield the right-of-way to the approaching sailboat or that the approaching sailboat should yield the right-of-way to the user's sailboat.

2. A navigational aid as defined in claim 1, including a third flat member, also disposed in apposition to the second member, but on the side opposite to the first member, said pivoting means fastening the second and third flat members to permit relative rotational movement therebetween, the third flat member having thereon at least one symbol thereon for designating a position and course of a second approaching sailing vessel, said second member having visibly distinguishable at least third and fourth areas marked thereon to be viewed by at least one viewing means on the third member, said viewing means on the third member having a third predetermined relationship with said third and fourth areas.

3. A navigational aid for use aboard a user's sailboat on a body of water as defined in claim 1 wherein said first distinguishable area when displayed through said viewing means indicates to the user to yield the right-of-way to the approaching sailboat, and wherein said second distinguishable area when displayed through said viewing means indicates to the user that the approaching sailboat should yield the right-of-way to the user's sailboat.

4. A navigational aid as defined in claim 1 wherein said first member comprises a disc pivoted at its center in rotating relationship with said second member, said second member having a portion extending radially beyond the disc comprising the first member.

5. A navigational aid as defined in claim 4 wherein said at least one symbol on the second member is disposed on said extended portion.

6. A nagivational aid as defined in claim 4 including an additional visually distinguishable area disposed between said at least one symbol and said pivoting means on said second member.

7. A portable navigational aid for use aboard a sailboat sailing on a body of water, for use in determining the right-of-way of approaching sailboats being met by a user's sailboat, by considering the wind-direction on said body of water, said navigational aid comprising:

a first flat member having a plurality of symbols thereon for designating a position and course of each of a plurality of approaching sailboats;

a second flat member disposed in apposition to the first member and having at least one symbol thereon for designating a position and course of said user's sailboat;

pivoting means for pivotally fastening said first member to the second member so as to permit relative rotational movement therebetween about said pivot, said first member having thereon a pointer mark to deonote wind-direction on said body of water, said first member also having a plurality of viewing means each of which corresponds to one of said plurality of symbols, each said viewing means being aligned substantially radially with respect to a corresponding of said plurality of symbols on said first member, said second member having visibly distinguishable first and second areas marked thereon for being viewed through said viewing means, the first and second distinguishable areas comprising annular portions, the areas having a predetermined relationship to and being aligned substantially with said at least one symbol on said second member, whereby when the second flat member is rotated about said pivot so that its symbol is aligned with the position and course of the user's sailboat and the first flat member is oriented so that said pointer mark thereon points in the wind-direction, a selected one of the plurality of said viewing means which corresponds to an observed position and course of an approaching sailboat displays either the first or second of said distinguisable areas which respectively and readily indicate to the user either to yield the right-of-way to the approaching sailboat or proceed without yielding right-of-way.

8. A nagivational aid as defined in claim 7 wherein said first member comprises a disc, and wherein said plurality of viewing means comprise windows through which said first and second areas can be viewed.

9. A navigational aid as defined in claim 8 wherein each said window is radially aligned with its corresponding symbol on the first flat member, and said windows are disposed at different radial distances from said pivoting means, said radial distances being determined by said predetermined relationships.

10. A navigational aid as defined in claim 9 wherein said first distinguishable area is colored red, and said second distinguishable area is colored green.

11. A portable navigational aid for use aboard a sailboat sailing on a body of water, for use in determining the right-of-way of approaching sailboats being met by a user's sailboat, the navigational aid comprising:

a first flat member having a mark thereon to denote wind-direction on the body of water, the first member also having a plurality of symbols thereon for designating a position and course of each of a plurality of sailing sailboats approaching along courses at different angles to the wind-direction;

a second flat member disposed in apposition to the first member and having at least one symbol on one side thereof for designating a position and a course of the user'sailboat;

pivoting means for pivotally fastening the first member to the second member so as to permit relative rotational movement therebetween about the pivot;

said first member having a plurality of viewing means, each of which corresponds to one of the plurality of symbols and substantially aligned radially with the pivot and a corresponding symbol of said plurality of symbols;

said second member also having visibly distinguishable first and second areas marked on the same side as said one symbol for being selectively viewed through said plurality of viewing means, the first and second distinguishable areas comprising annular portions with such sizes and such positions in relation to the pivot, in relation to the plurality of viewing means and said one symbol that, when the second flat member is oriented so that its said one symbol is aligned with the position and course of the user's sailboat and the first flat member is rotated about the pivot so that said mark thereon points along the direction which the wind is blowing, a selected one of the plurality of viewing means which corresponds to a selected one of the plurality of symbols displays either the first or the second of the distinguishable areas which respectively and readily indiate to the user either to yield the right-of-way to a sailboat approaching along the course of the selected symbol or proceed without yielding right-of-way.

12. A portable navaigational aid as in claim 11, including a third flat member also disposed in apposition to the second member, but on the side opposite to the first member, the pivoting means pivotally fastening the second and third flat members so as to permit relative rotational movement therebetween;

the third member having at least one second symbol thereon for designating a position and a course of a second approaching vessel and at least one second viewing means corresponding to the second symbol;

the second member having visibly distinguishable third and fourth areas marked thereon on the side opposite to the side on which the first and second distinguishable areas are marked;

The second member having at least one third symbol for designating a position and a course of the user's sailboat, the third symbol being marked on the side opposite to the side of the at least one symbol;

the third and fourth distinguishable areas having annular portions for being selectively viewed through the second viewing means; and the annular portions of the third and fourth areas having such sizes and such positions in relation to the pivot, in relation to the second viewing means and said third symbol, that when the second flat member is oriented so that its said third symbol is aligned with the position and the course of the user's sailboat and the third flat member is rotated about the pivot so that said second symbol corresponds to an observed position and course of an approaching vessel, the second viewing means displays either the third or the fourth distinguishable areas which respectively and readily indicate to the user either to yield the right-of-way to the observed approaching vessel or to proceed without yielding right-of-way.

13. A portable nagivational aid as defined in claim 11 wherein said first distinguishable area is colored red and said second distinguishable area is colored green.

* * * * *